United States Patent Office 3,305,133
Patented Feb. 21, 1967

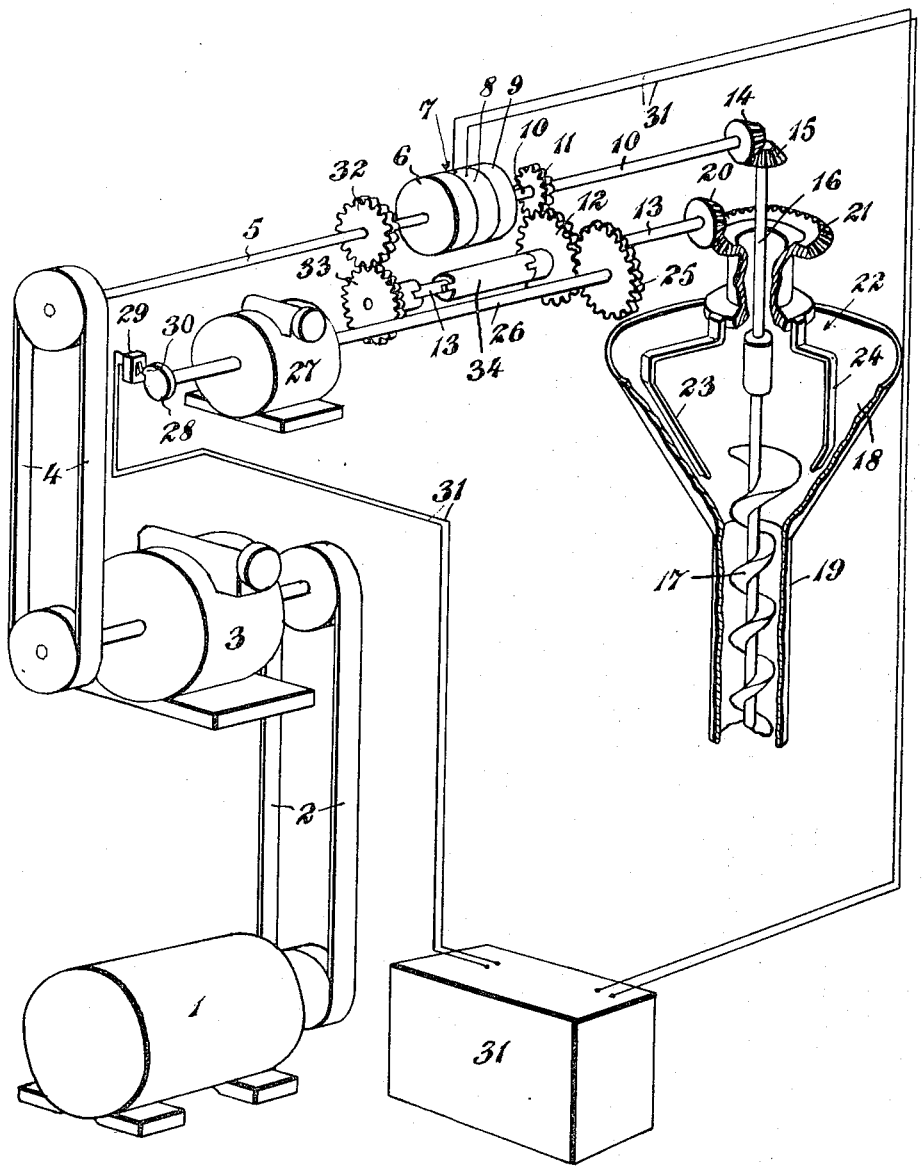

3,305,133
VARIABLE POSITION CONTROL SYSTEM FOR MATERIAL FEEDING APPARATUS AND THE LIKE
Denis Ronald Parker, Walmley, Sutton Coldfield, England, assignor to Southhall & Smith Limited, Birmingham, England, a British company
Filed Oct. 20, 1964, Ser. No. 405,178
Claims priority, application Great Britain, Oct. 23, 1963, 41,722/63
8 Claims. (Cl. 222—70)

This invention relates to a variable position control system particularly, but not exclusively, for angular position control of a feed auger of a material feeding system.

The principal object of the invention is the provision of a particularly accurate control of the rotational displacement of a feed auger to attain an accurately controlled delivery of material by said auger.

According to the invention a variable position control system comprises:

(1) an electromagnetically operated clutch/brake mechanism, (2) driving means connected for driving said clutch/brake mechanism, (3) an output shaft connected for driving by said clutch/brake mechanism, (4) an infinitely variable gear box having its input connected for driving by said output shaft, (5) rotatable control means actuated by rotation of the output of said infinitely variable gear box, and (6) an electrical circuit connected to said rotatable control means and to said clutch/brake mechanism to actuate said electromagnetic operation of the clutch/brake mechanism to provide a rotation of the output shaft dependent on the adjustment of the infinitely variable gear box.

Also according to the invention a material feeding apparatus comprises a variable position control system as defined in the preceding paragraph wherein said output shaft has driving connection to a feed auger.

A typical example of the invention will now be described with reference to the accompanying schematic drawing.

In the drawing the invention is utilized in a volumetric material feeding apparatus comprising an electric drive motor 1 driving through belt 2 the input of a variable speed gear box 3 whose output drives through belt 4 a driving shaft 5. The driving shaft 5 is connected to the driving clutch member 6 of an electromagnetic clutch/brake mechanism 7.

The clutch/brake mechanism 7 comprises two further members 8 and 9 co-axially disposed with respect to the driving clutch member 6, i.e., a fixed brake member 9, and a driven armature member 8 axially slidable between alternative contact with the driving member 6 or with the fixed brake member 9. A suitable clutch/brake mechanism 7 is that known commercially as a "Westool SF 500" clutch and brake unit. The driven member 8 is coupled to an output shaft 10 whereby, according to the axial position of the driven member 8, the output shaft 10 is either drivable from the driving shaft 5, or is braked.

The output shaft 10 carries an output pinion 11 fast thereon which meshes in 3 to 1 ratio with a lay pinion 12 rotatably mounted on a lay shaft 13. The output shaft 10 also carries a bevel gear 14 meshing with an identical bevel gear 15 on a feeding shaft 16. The feeding shaft 16 is coupled to an auger screw 17 for feeding material from a hopper 18 through a cylindrical feed tube 19 leading from the hopper 18, so that a given rotation of the auger screw 17 effects an accurately proportionate volumetric delivery of material from said feed tube 19.

The lay shaft 13 is connected through bevel gears 20 and 21 of 3 to 1 ratio with a stirring device 22 including two arms 23 and 24 depending into the hopper 18. The lay pinion 12 rotatably mounted on lay shaft 13 is meshed in 1 to 1 ratio with a gear box pinion 25 fast on a timing shaft 26 leading through an infinitely variable gear box 27 to and rotatable with a profile cam 28 so that rotation of the output shaft 10 to feed material through the feed tube 19 simultaneously rotates the lay pinion 12 at a third of the output shaft speed and rotates the profile cam 28 in a ratio of said third of the output shaft speed determined by the infinitely variable gear box 27.

A suitable infinitely variable gear box is known as a "Kopp" gear box which in one particular example is capable of producing an infinite number of gear ratios in the range between ⅓ to 1 and 1 to 3. Hence, in this example, any ratio between 1 and 9 full turns of the output shaft 10 can be obtained for one full turn of the profile cam 28 according to the setting of the infinitely variable gear box 27.

The rotatable profile cam 28 is associated with switching means comprising a micro-switch 29 actuated by a single lobe 30 on said cam 28. The micro-switch 29 is connected through an electrical control circuit 31 for controlling the electromagnetic operation of the clutch/brake mechanism 7.

A driving pinion 32 is fast on the driving shaft 5 and is meshed in 5 to 3 ratio with a driven pinion 33 rotatably mounted on the lay shaft 13. A dog clutch member 34 is keyed to shaft 13 so as to be slidable between complementary clutch members on the driven pinion 33 and the lay pinion 12 to connect either of said pinions 33 or 12 with the lay shaft 13. When the driven pinion 33 is connected to the lay shaft 13 the latter rotates with the driving shaft 5 to actuate the stirring device 22. When the lay pinion 12 is connected to the lay shaft 13 actuation of the stirring device 22 is only effected with rotation of the auger screw 17. Continuous or intermittent rotation of stirrer 22 is elected according to the nature of the feed material.

In operation, with the hopper 18 filled with the material to be fed by the auger screw 17 and the drive motor 1 energized, the motor 1 continually rotates the driving clutch member 6 at a speed determined by the motor 1 and the gear box 3, said speed being that desired for the feed auger 17. To commence a feeding cycle, the armature member 8 of the clutch/brake mechanism 7 is actuated through the electric control circuit 31 and is slid axially from engagement with the brake member 9 into engagement with the driving clutch member 6 to rotate the output shaft 10 and hence the feed auger 17. Simultaneously the profile cam 28 is rotated from a predetermined starting position at a speed in a ratio to that of the output shaft 10 determined by the setting of the infinitely variable gear box 27 from an initial position to a position where the micro-switch 29 is actuated by the lobe 30. This actuation causes the armature member 8 to be disengaged from the driving clutch member 6 and to be engaged with the brake member 9. The feed auger 17 is thus stopped, having turned through the required number of complete and part revolutions necessary to feed the desired volumetric amount of material.

If desired the electric control circuit 31 may include counting and/or delay devices known per se whereby a given number of actuations of the micro-switch 29 are required before the clutch/brake mechanism 7 is actuated to arrest the feed screw 17.

I claim:
1. A variable position control system comprising:
   (1) an electromagnetically operated clutch/brake mechanism,
   (2) driving means connected for driving said clutch/brake mechanism,
   (3) an output shaft connected to be driven by said clutch/brake mechanism in the clutch engaged position of said mechanism,
   (4) an infinitely variable gear box having its input in driven connection with said output shaft,
   (5) control means in direct drive connection with the output of said infinitely variable gear box to be continuously rotated from a predetermined starting position through the drive connection provided by said gear box whenever said mechanism is set in clutch-engaged position to rotate said output shaft,
   (6) the rate of rotation of said control means relative to said output shaft being dependent upon the ratio adjustment of said infinitely variable gear box,
   (7) a control circuit for said mechanism, and
   (8) switch means forming a part of said circuit and being actuable by rotation of said control means to set said mechanism in brake-engaging position for simultaneously arresting rotation of said output shaft and of said control means to provide an angular displacement of said output shaft which is dependent upon the ratio of adjustment of said gear box,
   (9) rotation of said control means being arrested substantially at said starting position by brake engagement of said mechanism.

2. A variable position control system according to claim 1, wherein said rotatable control means comprises a cam.

3. A material feeding apparatus comprising a variable position control system according to claim 1, wherein said output shaft is drive connected to a feed auger.

4. A material feeding apparatus according to claim 3, further comprising a material storage hopper, and a cylindrical feed tube leading from said hopper and housing said feed auger.

5. Material feeding apparatus comprising:
   (1) an electromagnetically operated clutch/brake mechanism,
   (2) driving means connected for driving said clutch/brake mechanism,
   (3) an output shaft connected to be driven by said clutch/brake mechanism in the clutch engaged position of said mechanism,
   (4) an infinitely variable gear box having its input in driven connection with said output shaft,
   (5) rotatable control means actuated by rotation of the output of said infinitely variable gear box,
   (6) an electrical circuit activated by said rotatable control means to set said mechanism in the brake engaged position to provide an angular displacement of the output shaft dependent on the ratio adjustment of the infinitely variable gear box,
   (7) a feed auger having a driving connection to said output shaft,
   (8) a material storage hopper,
   (9) a cylindrical feed tube leading from said hopper and housing said feed auger,
   (10) a lay shaft,
   (11) a second clutch for drive connecting said driving means to the lay shaft, and
   (12) a stirring device disposed in the hopper and connected to be driven from the lay shaft.

6. A material feeding apparatus according to claim 5, comprising:
   (1) a lay pinion rotatably mounted about the lay shaft,
   (2) an output pinion fixed to the output shaft and meshed with the lay pinion, and
   (3) a gear box pinion connected to the infinitely variable gear box and meshed with said lay pinion,
   (4) said output, lay and gear box pinions constituting said driving connection between the infinitely variable gear box and the output shaft.

7. A material feeding device according to claim 6, comprising:
   (1) a driving pinion on said driving means,
   (2) a driven pinion rotatably mounted on said lay shaft and meshed with said driving pinion, and
   (3) said second clutch providing alternative connection of said driven pinion and said lay pinion to said lay shaft.

8. Apparatus for controllably varying the rotational position of a member comprising drive means, an electrically operated clutch having its input connected to said drive means, an output shaft drive connected between said clutch and said member, cam means, means including adjustable variable speed means providing a direct drive connection between said cam means and said output shaft to continuously rotate said cam means from a predetermined starting position whenever said clutch is set in clutch-engaged position to rotate said output shaft, the rate of rotation of said cam means relative to said output shaft being dependent on the ratio of adjustment of said variable speed means, brake means for arresting rotation of said output shaft and of said cam means through the drive connection provided by said variable speed means, an electrical circuit for controlling actuation of said clutch and said brake means, and switch means forming a part of said circuit and being actuatable by rotation of said cam means through an angle determined by the ratio adjustment of said variable speed means to disengage said clutch and to actuate said brake means for simultaneously arresting rotation of said output shaft and said cam means to thereby provide an angular displacement of said output shaft dependent upon the ratio adjustment of said variable speed means.

References Cited by the Examiner

UNITED STATES PATENTS

| | | | |
|---|---|---|---|
| 2,532,913 | 12/1950 | Higginbottom | 222—70 X |
| 2,641,384 | 6/1953 | Mateer | 222—70 |
| 2,767,743 | 10/1956 | Kindseth | 222—70 X |
| 2,778,387 | 1/1957 | Diehl | 222—70 X |
| 3,148,802 | 9/1964 | Webb | 222—241 X |

M. HENSON WOOD, JR., *Primary Examiner.*

LOUIS J. DEMBO, *Examiner.*

A. N. KNOWLES, *Assistant Examiner.*